United States Patent [19]
Domanski

[11] Patent Number: 5,941,196
[45] Date of Patent: Aug. 24, 1999

[54] AMUSEMENT DEVICE FOR PETS

[76] Inventor: Rich Domanski, P.O. Box 29, Wood-Ridge, N.J. 07075-0029

[21] Appl. No.: 09/161,649

[22] Filed: Sep. 28, 1998

Related U.S. Application Data

[60] Provisional application No. 60/062,695, Oct. 23, 1997.

[51] Int. Cl.⁶ .............................. A01K 29/00; A01K 1/04
[52] U.S. Cl. ........................ 119/708; 119/780; 446/229; 446/236; 472/7
[58] Field of Search .................... 119/708, 703, 119/704, 707, 780; 446/227, 228, 229, 236; 472/7

[56] References Cited

U.S. PATENT DOCUMENTS

| | | |
|---|---|---|
| 2,096,078 | 10/1937 | Windson . |
| 2,833,244 | 5/1958 | Bohlman . |
| 3,055,660 | 9/1962 | Alexander ................................... 472/7 |
| 3,097,626 | 7/1963 | Felten . |
| 3,295,499 | 1/1967 | Manchester . |
| 3,312,195 | 4/1967 | Rohena ................... 119/701 |
| 3,665,892 | 5/1972 | Kusisto ................... 119/701 |
| 3,716,029 | 2/1973 | Pillsbury, Jr. ........................... 119/701 |
| 3,731,424 | 5/1973 | Meyer . |
| 3,919,795 | 11/1975 | Van Horne Jinivisian et al. ... 446/227 X |
| 4,363,181 | 12/1982 | Hyman et al. ............................ 40/466 |
| 4,517,922 | 5/1985 | Lind . |
| 4,568,077 | 2/1986 | Chan ............................................. 472/7 |
| 4,577,590 | 3/1986 | Skroch . |
| 4,640,034 | 2/1987 | Zisholtz .............................. 446/227 X |
| 4,766,848 | 8/1988 | Rocco et al. ............................ 119/701 |
| 4,930,448 | 6/1990 | Robinson . |
| 4,940,018 | 7/1990 | Edling . |
| 4,984,380 | 1/1991 | Anderson ............................ 446/227 X |
| 5,103,770 | 4/1992 | Berkovich . |
| 5,111,771 | 5/1992 | Mathews . |
| 5,119,001 | 6/1992 | Moore et al. . |
| 5,148,769 | 9/1992 | Zelinger . |
| 5,352,145 | 10/1994 | Raiffe et al. ............................ 446/227 |
| 5,474,032 | 12/1995 | Krietzman et al. . |
| 5,505,161 | 4/1996 | Swendseid . |
| 5,675,225 | 10/1997 | Moore et al. ....................... 119/708 X |

Primary Examiner—Michael J. Carone
Assistant Examiner—James S. Bergin
Attorney, Agent, or Firm—Oblon, Spivak McClelland, Maier & Neustadt, P.C.

[57] ABSTRACT

A method and apparatus for amusement of pet animals, which includes a base member, a stand mounted on the base member, a first arm mounted on the stand, a drive member mounted on the first arm, a second arm mounted on the first arm and engageable with the drive member so as to be movable by the drive member, a rotatable member connected to an end portion of the second arm and an object which is suspended from the rotatable member and which is swingable by the rotatable member upon movement of the second arm by the drive member.

11 Claims, 1 Drawing Sheet

AMUSEMENT DEVICE FOR PETS

The present application is based on provisional application serial no. 60/062,695, filed Oct. 23, 1997, now abandoned, the priority of which is hereby claimed.

BACKGROUND OF THE INVENTION

1. Field of the Invention

The present invention is directed to a method and apparatus for the entertainment of pets and is specifically intended to supply amusing diversions to small animals and provide exercise for such animals.

2. Discussion of the Background

Prior pet amusement devices are known which include that described in U.S. Pat. No. 5,119,001, U.S. Pat. No. 5,103,770 and U.S. Pat. No. 4,930,448, the disclosures of each of which are incorporated herein by reference.

U.S. Pat. No. 5,119,001 is directed to a frequency controlled oscillating pet toy which includes an electric, gear driven, frequency controlled oscillating device that oscillates a toy mouse or other toys to amuse, occupy and entertain pets. Because the unit described therein is gear driven, it provides torque to ensure self starting after being stopped by a playful animal. The device is characterized by a low profile so as to help make it difficult to tip over. The toy operates at a low variable voltage range and is mountable in a plurality of planes for further variation of the operation of the same.

U.S. Pat. No. 5,103,770 is directed to a pet exercise device which includes a toy suspended from an arm operated by a motor having an electronic control capable of actuating the device at predetermined or random intervals and for varying the speed and direction of movement of the toy to provide movements which are more attractive to pets and thus be more challenging and interesting to the same.

U.S. Pat. No. 4,930,448 is directed to a toy device for a pet animal, the device including a base housing having an upper wall and an opening in the upper wall as well as a rotatable member rotatably mounted in the housing, a drive assembly for rotating the member, and an elongate member secured at one end to the rotatable member and extending upwardly as well as in a generally sideways direction from the housing. The device also includes an object secured to the free end of the elongate member for movement in a path around the housing upon rotation of the rotatable member. The object may be of any desired shape such as a ball, mouse, butterfly or other creature and is preferably arranged so as to be dragged along the ground in a generally circular path upon rotation of the rotatable member.

While the foregoing provide a variety of movements with respect to the object to be used to entertain the pet, such do not permit oscillation about an axis parallel to a horizontally extending arm which is disposed perpendicular to a stand mounted to a base.

SUMMARY OF THE INVENTION

It is therefore an object of the present invention to provide an object which is rotatable about an axis parallel to the support arm upon which the object is hung and to provide for a drive member mounted on the arm so as to permit additional freedom of motion of the object in a manner not heretofore recognized by any prior art device. The present invention is based upon the observation that domesticated animals, especially household pets, have become completely dependent upon their owners or masters and, as a result, have become lethargic in terms of daily activities. At present, many pet toys are available in the marketplace which do not properly stimulate pets and thus become abandoned after purchase. Although pets may play with toys of this type for a brief time, the fact that the toy is not animated causes a loss of interest in the object in a very brief period of time. There are also known toys which are articulated by a person operating the device or by motion from the pet itself. However, unless the articulation is continuous, the object will eventually be suspended in a manner without motion to stimulate the pet and the pet will lose interest in playing or exercising with the toy.

While various pieces of exercise equipment have been developed in the past which provide a system in which an arm is located on a stand and an object, collar or leash is attached to the arm in order to prod the pet to move in a circular direction around the stand, there are some pets which have been known to resist this type of inducement and, at the very least, have lost interest after a short period of time due to the monotony in the movement and speed by which the object or leash is moved in a circular motion.

In view of the foregoing, the present invention has been developed in order to overcome the disadvantages of the above-noted prior art which exists in the field of pet amusement and exercising equipment.

The primary objectives of the pet amusement and exercise device in accordance with the present invention is to provide a toy which is articulated or activated in a manner which does not become monotonous and which is thus both challenging and attractive to the pet. At the same time, the object in accordance with the present invention is suspended from the tether, thereby preventing such from becoming lost or become a tripping hazard to an owner of the pet when walking in the general area of the present invention.

An additional object of the present invention is to provide an amusement or exercise device which embodies a variable speed and variable arc during movement of the tethered object.

A further object of the present invention is to provide an amusement and exercise device which does not require the owner of the pet or any other individual to become involved in the operation of the same in order to be used by the pet.

Another object of the present invention is to provide an amusement or exercise device which forms the objects and prevent the same from creating a risk of the operator slipping and falling on either the device itself or the object which is secured therefrom.

Lastly, an additional object of the present invention is to provide a motorized toy which when actuated through pet involvement will vary the speed movement of the object, its arc and the motion thereof.

The amusement device of the present invention is characterized by and includes a base member, a stand mounted on the base member, a first arm mounted on the stand, a drive member mounted on the first arm, a second arm mounted on the first arm, a second arm mounted on the first arm and engageable with the drive member so as to be movable by the drive member, a rotatable member connected to an end portion of the second arm and an object which hangs from the rotatable member and which is swingable by the rotatable member upon movement of said second arm by said drive member.

The present invention is also characterized by a method for amusing a pet animal which includes the step of mounting the stand on the base, mounting the first arm member to the stand, connecting the second arm to the first arm, positioning the drive member so as to interengage the second arm member with the first arm member and to cause the second arm member to move with respect to the first arm member, and hanging the object from the end portion of a second arm member so as to be swingable upon movement of the second arm member by the drive member.

Applicant notes that the present invention is directed to an amusement device attached to a base which is weighted. The base can be of any shape, such as rectangular, square or circular, but should be of sufficient weight to support the device. The device includes a stand or pylon, wherein the embodiment illustrated shows a telescopic stand in order to alter the height of the device. From the top of the stand or pylon, a telescoping arm is attached, which arm runs parallel to the floor of the base upon which the present invention is placed. The arm attached may be located at the outermost section of a motor when the motor is activated by a battery pack or can, in the alternative, is activated by alternating current source. This motor may be provided with an on-off switch located within its container and accessible via the telescopic arm or can be remotely located on the stand or other suitable location, if desired. The motor would preferably operate at a variable speed. From the motor, there may be attached a second telescopic arm which could be adjustable in terms of length in order to modify or change both the speed and the arc at which the second arm is activated. From the end of the second telescopic arm, a tether is attachable which may consist of leather, string or an elastic member, for example. This tether could, in addition, be adjustable in order to further modify the action of the item, toy or device attached to the end of the tethered string. At the end of this tether is attached a toy which is suitable in terms of its nature, size and shape to provide a safe object for the pet to play with. In addition, from the end of the tether, there may be attached a leash or collar to provide exercise and training for certain pets. This would permit the telescopic arm to rotate with respect to the vertical axis of the telescopic stand. The present invention would not necessarily require the telescopic stand or arm, however, but telescoping stands and arms provide advantages in terms of variance in the movement of the object and the height at which the object could be suspended.

In view of the foregoing, it is to be understood that the present invention may be directed to an object tethered to a telescopic or stationary arm which articulates by operation of a simple motor located within a telescopic arm which is oriented parallel to the floor or attached to the stand or pylon which is secured to the weighted base.

DESCRIPTION OF THE PREFERRED EMBODIMENT

Figure 1:
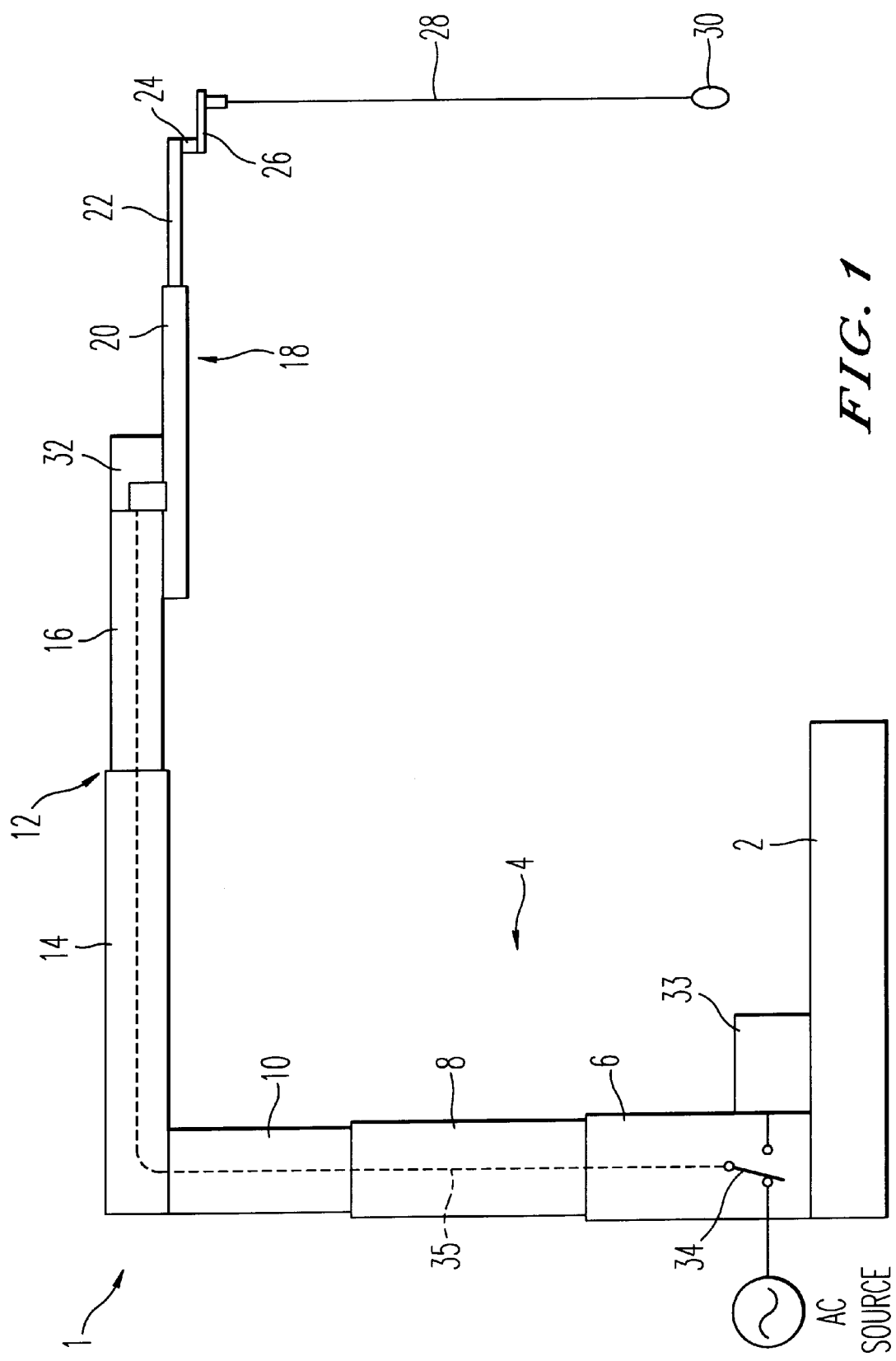
FIG. 1 discloses the preferred embodiment of the amusement device for a pet or animal in accordance with the present invention.

With reference to FIG. 1, it is noted that the amusement device 1 includes a base 2 upon which is mounted a telescopic stand 4 which is extendable to a desired height and which can either be pivotable about its axis or be stationary with respect to the base 2.

The telescopic stand 4 illustrated includes a first section 6, second section 8 and third section 10 which may either be nonrotatable with respect to one another or may be rotatable with respect to one another, depending upon the manner in which the toy is to be operated.

Upon the telescopic stand 4 is mounted a first telescopic arm 12 which may be either pivotable or stationary with respect to the stand 4. The telescopic arm 12 includes a first section 14 and a second section 16 which is extendable with respect to first section 14.

Mounted on second section 16 is a second telescopic arm 18 which is extentable to a desired length. Second telescopic arm 18 includes a first section 20 and a second section 22 which is slidable within first section 20 and is extendable to the position illustrated in FIG. 1. To the end of second section 22 is connected a rivet 24 which secures a rotatable sleeve 26 between the rivet and the end portion of second section 22.

Reference 28 designates an adjustable length of string, leather or similar type of line from which is suspended a toy object or exercise piece 30. Upon operation of motor 32, the object is movable back and forth in an arcuate manner or may be moved so as to rotate about the longitudinal axis of the second telescopic arm 18 so as to provide increased interest on the part of the pet.

The motor 32 comprises a variable speed motor which may be operated by a battery 33 located, for example, on the base 2 and electrically connected by wire to the motor. The motor 32 can be disposed, for example, within a housing and be connected by gears (not shown) with a cooperating gear or teeth formed on the first section 20 to rotate the second section 22. Alternatively, an electric source can provide either a direct current or alternating current via wiring 35. A control box may also be provided in proximity with motor 32 to assist in varying the speed at which the motor operates, as would be understandable to a person of ordinary skill. The operator may utilize an on/off switch 34 which could be located either on the motor itself or for example, at the base 2, or on the lowermost section of the telescopic stand.

Obviously, numerous modifications and variations of the present invention are possible in light of the above teachings. It is therefore to be understood that within the scope of the appended claims, the invention may be practiced otherwise than as specifically described herein.

I claim:

1. An amusement device for pet animals, comprising:
   a base member positionable on a floor;
   a stand mounted on said base member;
   a first arm substantially vertically mounted directly on said stand;
   a drive member mounted on said first arm;
   a second arm substantially horizontally mounted on said first arm and engaged with said drive member so as to be movable by said drive member;
   a rotatable member connected to an end portion of said second arm; and
   an object suspended from said rotatable member and which is swingable about a longitudinal axis of said second arm member, wherein said stand comprises a telescope stand that is adjustable in height and length with respect to said base member, by said rotatable member upon movement of said second arm by said drive member.

2. An amusement device as claimed in claim 1, wherein said drive member comprises one of an AC motor and a battery powered motor.

3. An amusement device as claimed in claim 2, wherein each of said first and second arms comprises a telescopic arm of an adjustable length.

4. An amusement device as claimed in claim 1, wherein said rotatable member comprises a sleeve member which is rotatable about an end portion of the second arm and from which said object is suspended.

5. An amusement device as claimed in claim 1, wherein said drive member comprises a drive member which imparts a motive force to said rotatable member so as to cause the object to be suspended therefrom to be swept in a circular motion about the longitudinal axis of said second arm.

6. An amusement device as claimed in claim 1, wherein each of said first and second arms comprise a telescopic arm of an adjustable length.

7. A method of amusing a pet animal, which comprises the steps of:

mounting a stand on a base such that said stand is adjustable in terms of height and length with respect to said base;

substantially vertically mounting a first arm member directly to said stand;

substantially horizontally connecting a second arm member to said first arm; and positioning a drive member on said first arm so as to interengage said second arm member with said first arm member and to cause said second arm member to move with respect to said first arm member; and suspending an object from an end portion of said second arm member so as to be swingable upon movement of said second arm member about a longitudinal axis of said second arm member by said drive member.

8. A method as claimed in claim 7, wherein said step of mounting said first arm member to said stand comprises mounting a telescopic arm member to said stand.

9. The method as claimed in claim 8, wherein the step of mounting the second arm member to the first arm member comprises telescopically mounting the second arm member to the first arm member.

10. A method as claimed in claim 7, wherein said step of mounting said second arm member to said first arm member comprises telescopically mounting the second arm member to said first arm member.

11. A method as claimed in claim 7, which comprises rotatably mounting a sleeve member to said second arm member and suspending said object from said sleeve member.

* * * * *